(12) United States Patent
Miller et al.

(10) Patent No.: US 10,416,009 B1
(45) Date of Patent: Sep. 17, 2019

(54) VORTEX SHEDDING FLOWMETER WITH WIDE DYNAMIC RANGE PIEZOELECTRIC VORTEX SENSOR

(71) Applicant: FlowPro, LLC, Louisville, CO (US)

(72) Inventors: Charles E. Miller, Boulder, CO (US); Michael Steinbach, Longmont, CO (US)

(73) Assignee: FLOWPRO, LLC, Louisville, CO (US)

( * ) Notice: Subject to any disclaimer, the term of this patent is extended or adjusted under 35 U.S.C. 154(b) by 156 days.

(21) Appl. No.: 15/429,968

(22) Filed: Feb. 10, 2017

Related U.S. Application Data

(60) Provisional application No. 62/294,908, filed on Feb. 12, 2016.

(51) Int. Cl.
  *G01F 1/32* (2006.01)
(52) U.S. Cl.
  CPC .................................. *G01F 1/3263* (2013.01)
(58) Field of Classification Search
  CPC .................................................... G01F 1/3263
  See application file for complete search history.

(56) References Cited

U.S. PATENT DOCUMENTS

| | | | | |
|---|---|---|---|---|
| 4,197,739 A | * | 4/1980 | Frick | G01F 1/3263 73/861.21 |
| 4,248,098 A | * | 2/1981 | Sawayama | G01F 1/3263 73/861.24 |
| 4,437,350 A | * | 3/1984 | Tamura | G01F 1/3245 73/861.24 |
| 4,703,659 A | * | 11/1987 | Lew | G01F 1/3245 73/861.24 |
| 4,706,503 A | * | 11/1987 | Kamentser | G01F 1/3209 73/861.24 |
| 4,791,818 A | * | 12/1988 | Wilde | G01F 1/3263 73/861.24 |
| 4,926,695 A | * | 5/1990 | Kleven | G01F 1/3263 73/861.24 |
| 4,984,471 A | * | 1/1991 | Storer | G01F 1/3263 73/861.24 |
| 5,197,336 A | * | 3/1993 | Tsuruoka | G01F 1/3263 73/861.24 |
| 5,313,843 A | * | 5/1994 | Tsuruoka | G01F 1/3218 73/861.24 |
| 5,343,762 A | * | 9/1994 | Beulke | G01F 1/3218 73/861.24 |

(Continued)

FOREIGN PATENT DOCUMENTS

| | | |
|---|---|---|
| CN | 210764 | 6/1992 |
| CN | 2107641 | 6/1992 |

OTHER PUBLICATIONS

Measurement Specialties, Inc., Sensor Products Division, Piezo Film Sensors Technical Manual, Rev. B Apr. 2, 1999.

*Primary Examiner* — Natalie Huls
(74) *Attorney, Agent, or Firm* — James R. Young; Cochran Freund & Young LLC

(57) ABSTRACT

A vortex shedding flowmeter has a vortex sensor with a cantilever mounted transducer vane comprising a piezoelectric polymer film laminated together with an elastic substrate and that is encapsulated in an elastomeric integument to enable the transducer vane to withstand vortex pressure fields that span more than three orders of magnitude with sensitivities that provide high turn down ratios.

17 Claims, 7 Drawing Sheets

(56) References Cited

U.S. PATENT DOCUMENTS

| | | | | |
|---|---|---|---|---|
| 6,095,175 | A * | 8/2000 | Miller | F16K 31/004 |
| | | | | 137/15.18 |
| 6,170,338 | B1 * | 1/2001 | Kleven | G01F 1/3254 |
| | | | | 73/861.22 |
| 6,220,103 | B1 * | 4/2001 | Miller | G01F 1/3263 |
| | | | | 73/861.22 |
| 6,276,218 | B1 | 8/2001 | Waers | |
| 6,352,000 | B1 * | 3/2002 | Getman | G01F 1/3263 |
| | | | | 73/861.22 |
| 7,004,373 | B1 * | 2/2006 | Miller | B23K 20/004 |
| | | | | 228/103 |
| 8,512,947 | B2 * | 8/2013 | Mutharasan | G01N 33/54373 |
| | | | | 422/68.1 |
| 2005/0034535 | A1 * | 2/2005 | Sprague | G01F 1/3209 |
| | | | | 73/861.22 |
| 2005/0092101 | A1 * | 5/2005 | Bengtson | G01F 1/3209 |
| | | | | 73/861.22 |
| 2010/0191120 | A1 * | 7/2010 | Kraus | A61B 5/6843 |
| | | | | 600/459 |
| 2012/0160032 | A1 * | 6/2012 | Habersetzer | G01F 15/02 |
| | | | | 73/861.01 |
| 2015/0122051 | A1 * | 5/2015 | Frey | G01F 1/3263 |
| | | | | 73/861.24 |

* cited by examiner

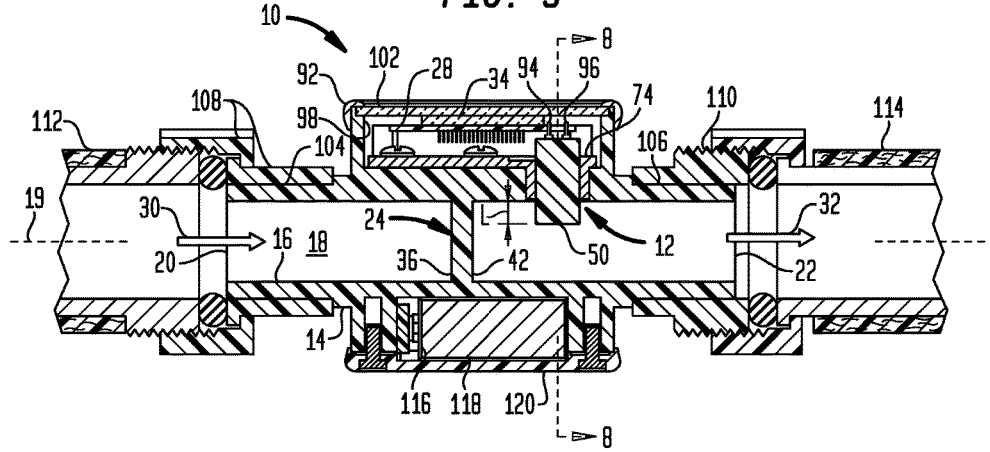

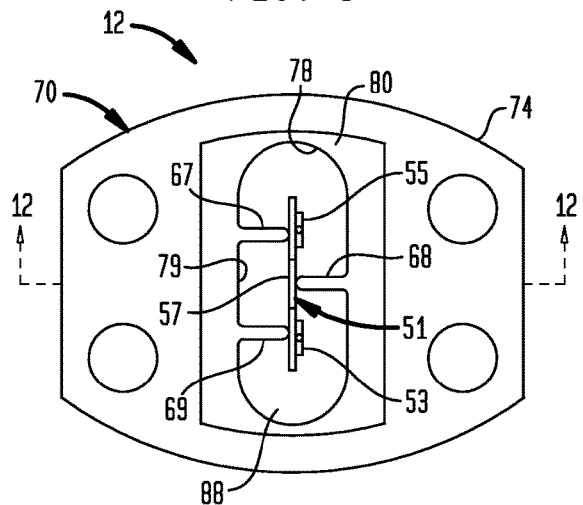
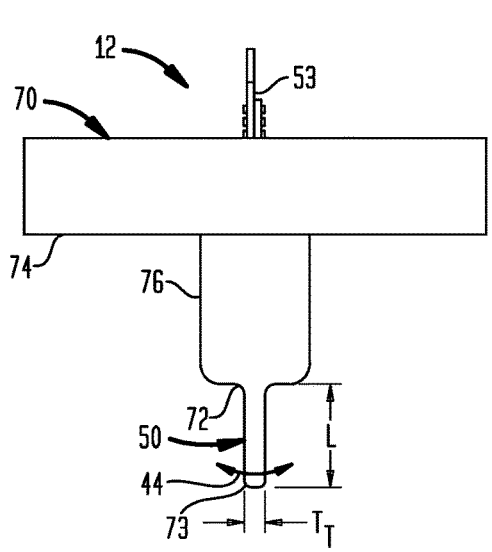
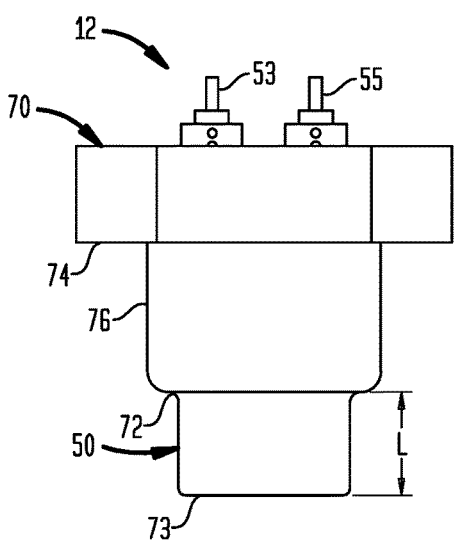

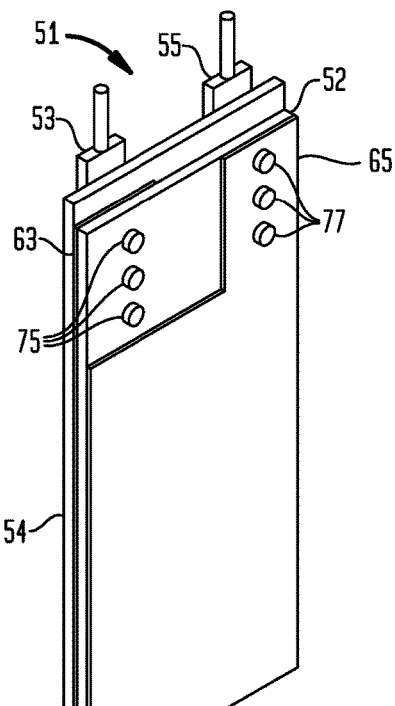
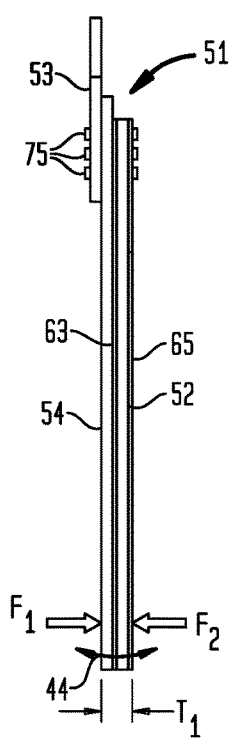
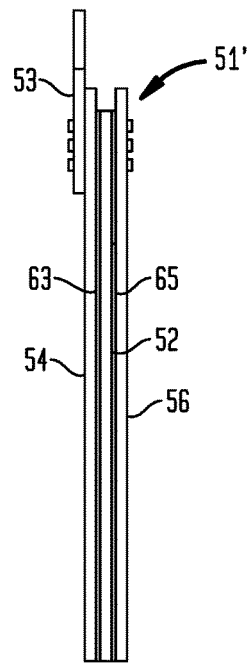
FIG. 13
FIG. 14
FIG. 15

VORTEX SHEDDING FLOWMETER WITH WIDE DYNAMIC RANGE PIEZOELECTRIC VORTEX SENSOR

BACKGROUND

Technical Field of the Invention

The present invention is related in general to vortex shedding flowmeters and more particularly to a vortex sensor that can provide stable, long life accuracy and repeatability over larger flow rate ranges as a result of ability to detect very weak vortex pressure fields with a vortex sensor structure that can also withstand vortex pressure fields that span more than three orders of magnitude, e.g., that is capable of withstanding and measuring accurately high-pressure vortex pressure fields that are more than two thousand times stronger than the weakest vortex pressure field that is accurately detectable with the sensor.

State of the Prior Art

Vortex shedding flowmeters are well-known and are used in many flow metering applications. Vortex shedding flowmeters operate by creating a series of vortices, commonly called a Karmen vortex street, in a flowing fluid and detecting the vortex frequency as an indication of flow velocity. Basically, an obstruction, such as a bluff body, is positioned in the flowing fluid to create vortices in the fluid flow, and a vortex detector is positioned downstream of the obstruction to detect the alternating vortex pressure fields associated with the vortices. In general, the higher the flow velocity of the fluid, the higher the frequency of the vortices created, so the frequency of the vortices is an indication of the flow velocity of the fluid. Vortex sensing flow meters have a number of attributes and advantages, including minimal moving parts to jam, hang up, or wear, usable over a wide range of temperatures, usable in a wide range of line sizes, and low maintenance costs. However, vortex shedding flow meters generally work best in medium to high speed fluid flows, because vortex pressure fields in slow flowing fluids are very weak and difficult to detect.

Besides ultrasonic sensors and thermistors for sensing vortex pressure fields, typical vortex detecting transducers include some kind of vane in the flowing fluid that flexes in response to the passing vortex pressure fields and some kind of piezoelectric strain gauge connected in some manner to the vane to detect strains in the flexing vane. Such typical piezoelectric vortex detecting flow meters can provide accurate, repeatable flow rate measurements rangeability of about 10 to 1. In other words, the minimum flow rate detectable on an accurate, repeatable basis with a particular piezoelectric vortex detecting transducer is about one-tenth the maximum flow rate that is detectable on an accurate, repeatable basis with that same piezoelectric vortex detecting transducer. For example, if the minimum detectable flow rate of a vortex shedding flowmeter with a piezoelectric vortex detecting transducer is one (1) gallon per minute (gpm), the maximum flow rate measurable on an accurate, repeatable basis for that flowmeter would typically be about ten (10) gallons per minute (gpm). Such a 10 to 1 flow rate measuring rangeability is sufficient for many applications, but it is also too limited for many other applications.

The foregoing examples of the related art and limitations related therewith are intended to be illustrative and not exclusive. Other limitations of the related art and other examples of related art will become apparent to those of skill in the art upon a reading of the specification and a study of the drawings.

BRIEF DESCRIPTION OF THE DRAWINGS

The accompanying drawings, which are incorporated herein and form a part of the specification, illustrate some, but not the only or exclusive, example embodiments and/or features of or relating to vortex sensor units and implementations of such vortex sensor units in flowmeter apparatus. It is intended that the embodiments and figures disclosed herein are to be considered illustrative rather than limiting. In the drawings:

FIG. 5 is cross-section view of the example flowmeter in FIG. 1 taken along section plane 5-5 in FIG. 3;

FIG. 6 is a cross-section view of the example fluid flowmeter in FIG. 1 taken along section plane 6-6 in FIG. 2;

FIG. 7 is a cross-section view of the example flowmeter in FIG. 1 taken along section plane 7-7 in FIG. 2;

FIG. 9 is an enlarged top plan view of the example vortex sensor unit in FIGS. 4-8;

FIG. 10 is an enlarged front elevation view of the example vortex sensor unit in FIGS. 4-8;

FIG. 11 is an enlarged right side elevation view of the example vortex sensor unit in FIGS. 4-8.

FIG. 13 is an isometric perspective view of an example high compliance piezoelectric vane of the vortex detector unit of the flowmeter in FIG. 1;

FIG. 14 is a front side elevation view of the example high compliance piezoelectric vane in FIG. 13; and FIG. 15 is a front side elevation view of an example alternate high compliance piezoelectric vane illustrating a piezoelectric material in the piezoelectric vane sandwiched between two support sheets.

DETAILED DESCRIPTIONS OF EXAMPLE EMBODIMENT

An example vortex shedding flowmeter 10 illustrated in FIGS. 1-8 has a sensitive vortex sensor unit 12 (best seen in FIGS. 5-12) that provides highly accurate and reliable flow measurements over large flow rate ranges. The vortex sensing unit 12 will be described in more detail below, including features and criteria that enable the vortex sensing unit 12 to detect vortex pressure fields in a wide range of intensities over a wide frequency spectrum so that a flowmeter equipped with the vortex sensor unit 12 can detect and measure flow rate ranges as high as at least 40 to 1 and even 50 to 1 with very high accuracy and repeatability (e.g., 99 to 100 percent accuracy). In the flow meter industry, the flow rate rangeability is sometimes called turndown ratio (turndown from maximum flow rate), which is the ratio of the high end of the measurement range of the flow meter to the low end of the measure measurement range. Accordingly, with a turndown ratio of 50 to 1, the example flowmeter 10 (or any other flowmeter) equipped with the vortex sensor unit 12 can measure volumetric flow rates of, for example, water from 0.5 gallons per minute (gpm) to 20 gpm, which is suitable for measuring flow rate ranges in typical residential domestic water systems, and with 99 to 100 percent accuracy. Yet, the vortex sensor unit 12 is simple and inexpensive enough that flowmeters with that kind of sensitivity and accuracy can be mass produced and marketed in mass retail and big box store markets at prices attractive to average home owning consumers, landscape professionals, builders, and many others.

Figure 1:
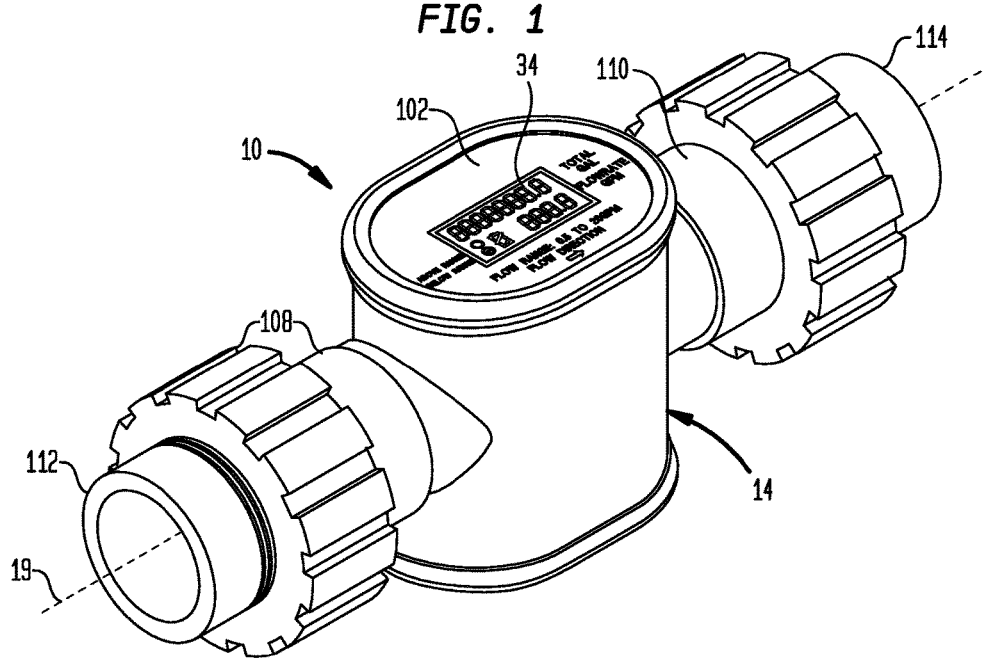
FIG. 1 is a perspective view of an example flowmeter with a high compliance vortex sensor unit illustrated with example optional hose connectors.
Figure 2:
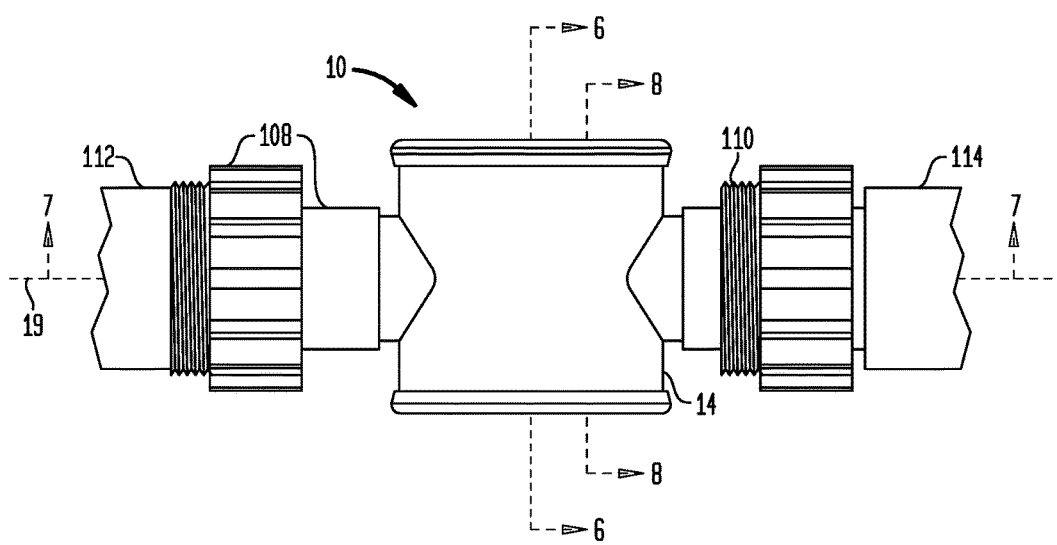
FIG. 2 is right side elevation view of the example flowmeter in FIG. 1 illustrated with the example optional hose connectors.
Figure 3:
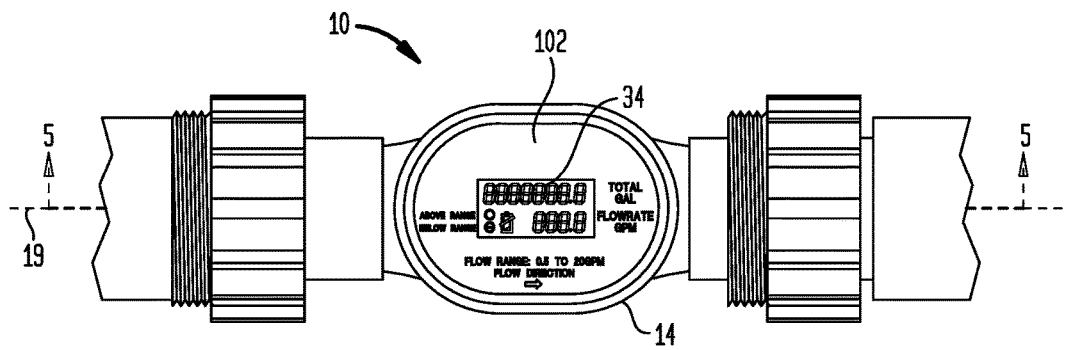
FIG. 3 is a top plan view of the example flowmeter in FIG. 1 illustrated with the example optional hose connectors.
Figure 4:
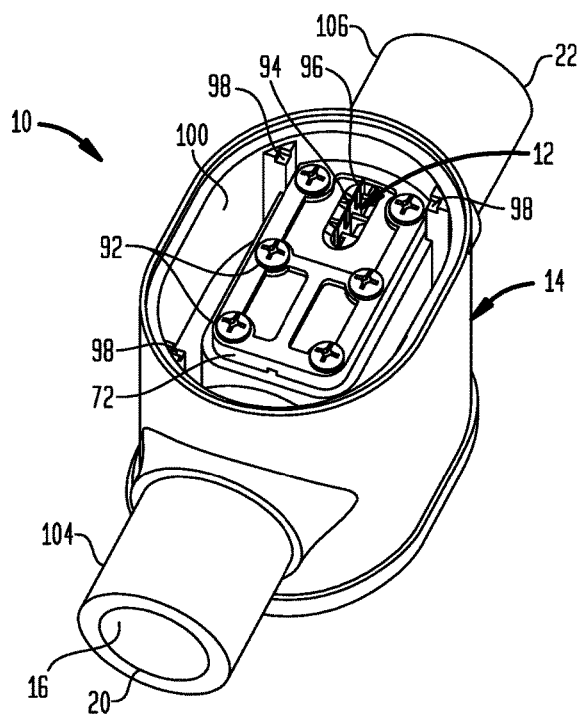
FIG. 4 is a perspective view of the example flowmeter in FIG. 1 with the top panel and display removed to reveal an example mounting structure for the sensor and without the example optional hose connectors that are illustrated in FIG. 1.
Figure 8:
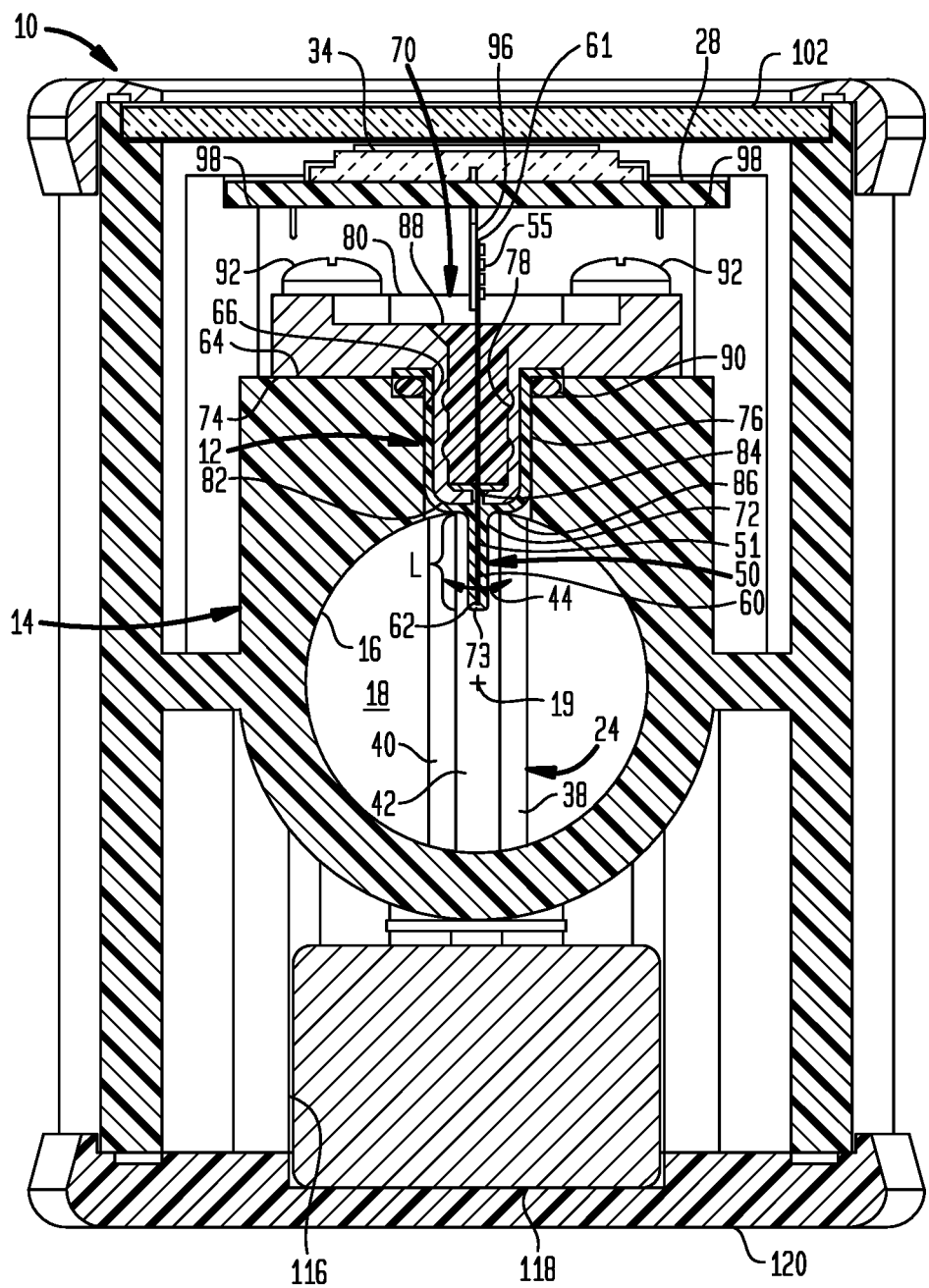
FIG. 8 is an enlarged cross-section view of the example flowmeter in FIG. 1 taken along section plane 8-8 in FIGS. 2 and 5.

The example flowmeter 10 in FIGS. 1-8 includes a meter body 14 with an interior wall 16 that forms a flow passage 18 which extends along a longitudinal axis 19 between an inlet end 20 and an outlet end 22 of the meter body 14, as best seen in FIGS. 4-7, for conducting a flow of fluid through the flowmeter 10. An example vortex generator 24, e.g., a bluff body, is shown in FIGS. 5, 7, and 8 positioned diametrically across the flow passage 18 for generating vortices, e.g., vortices 26a, 26b in FIG. 7, in a fluid which flows as indicated by flow arrows 30, 32 through the flow passage 18. The vortex sensor unit 12 detects pressure fluctuations (e.g., vortex pressure fields) in the fluid flowing through the passage 18 associated with the vortices 26a, 26b, which are related to the flow velocity of the fluid, and generates electric signals which are indicative of the flow velocity of the fluid flowing through the flow passage 18. The vortex sensor 12 is connected electrically to an electric circuit, for example on a circuit board 28, for generating a display 34 (see FIGS. 1 and 3) or other output that is indicative of, or based on, the flow rate of the fluid flowing through the flow passage 18. Persons skilled in the art understand that volumetric flow rate can be calculated by multiplying the flow velocity times the cross-sectional area of the flow passage 18.

The example vortex generator 24 in the example flowmeter 10 is shown as a slender component extending diametrically across the flow passage 18 and having a bluff body shape that generates the vortices 26a, 26b in the flowing fluid 30, 32. The example bluff body shape of the vortex generator 24 has a trapezoidal cross-section, as shown in FIGS. 5, 7, and 8, with a flat front surface 36 facing the inlet end 20 of the meter body 14 and lateral surfaces 38, 40 that converge inwardly from respective lateral edges 39, 41 of the flat front surface 36 toward each other to a rear surface 42. However, other bluff body or vortex generator shapes and sizes can be used, and the bluff body or vortex generator 24 can be extended entirely or just partially across the flow passage 18 as long as it is effective for generating the vortices 26a, 26b in the flowing fluid. In general, when a fluid flows through the passage 18 as illustrated by the flow arrows 30, 32 in FIG. 7, the fluid is forced by the front surface 36 of the bluff body vortex generator 24 to be diverted laterally around the vortex generator 24, thereby accelerating fluid flow past the lateral edges 39, 41 of the front surface 36 and causing a boundary layer of the fluid to separate from the vortex generator 24 at or near those lateral edges 39, 41. Such fluid flow acceleration and boundary layer separation generates the series of vortices 26a, 26b with associated high and low vortex pressure fields, commonly known as a Karmen vortex street, in the wake downstream of the vortex generator 24. As is well-known in the art, such vortices are shed from the opposite sides of the vortex generating member 14 in a periodic, alternating pattern, as illustrated in FIG. 7, at a frequency that is proportional to the flow velocity of the fluid.

The vortex sensor unit 12 comprises a high compliance sensor cantilever 50, which is positioned downstream from the vortex generator 24, as best seen in FIGS. 5 and 7. In that position downstream from the vortex generator 24, the sensor cantilever 50 is exposed to the vortex street (i.e., fluctuating vortex pressure fields in the fluid), which is generated by the vortex generator 24 in the fluid flowing through the passage 18 as explained above. The alternate vortices 26a, 26b of the vortex street in the flowing fluid create alternating high and low local pressure fields in the fluid that apply sequential, alternating lateral forces on opposite lateral sides of the sensor cantilever 50 as the alternating vortices 26a, 26b flow past the sensor cantilever 50. Such alternating forces cause the sensor cantilever 50 to oscillate side to side, as indicated by the oscillation arrow 44 in FIGS. 7 and 8, at the same frequency as the respective vortices 26a, 26b flow past the sensor cantilever 50. The oscillating motion 44 of the sensor cantilever 50 causes a piezoelectric material in the sensor cantilever 50, which will be described below, to generate electrical signals of that same frequency. As mentioned above, the electrical signals are amplified and processed in an electric circuit to produce a display 34 (FIGS. 1 and 3) that is indicative of the volumetric flow rate of the fluid flowing through the passage 18 or that is indicative of some other parameter that may be related to, or based on, flow rate related output, such as, for example, total flow over a period of time.

As best seen in FIGS. 8-12, the sensor cantilever 50 of the example vortex sensor unit 12 protrudes from a sensor mounting block 70 in a manner in which a proximal end 72 of the sensor cantilever 50 is fixed in immovable relation to the sensor mounting block 70 while the rest of the sensor cantilever 50 extends a distance L from the sensor mounting block 70 to a distal end 73 of the sensor cantilever 50. The distal end 73 of the sensor cantilever 50 is movable laterally from side to side in relation to the sensor mounting block 70 as indicated by the arrow 44 in FIGS. 7 and 8 and explained above.

As best seen in FIGS. 5-8, the sensor mounting block 70 is mounted in an immovable manner in the meter body 14 to position and align the sensor cantilever 50 in the flow passage 18 downstream from the vortex generator 24, where the sensor cantilever 50 is exposed to the vortex pressure fields of the alternating vortices 26a, 26b (FIG. 7). In the example flowmeter 10, the sensor mounting block 70 positions the proximal end 72 of the sensor cantilever 50 flush with the interior wall 16 so that the entire length L of the sensor cantilever 50 extends into the flow passage 18. Therefore, when the flow passage 18 is full of a flowing fluid, the length L of the sensor cantilever 50 penetrates the flowing fluid and is exposed to the pressure fields of the vortices 26a, 26b. The sensor block 70 could be mounted in a manner such that its shank portion 76, thus also the proximal end 72 of the sensor cantilever 50 is recessed into the interior wall 16 from the flow passage 18 so that less than the full length L of the sensor cantilever 50 would be extended into the flow passage 18, but then the full length L of the sensor cantilever 50 would not be exposed as effectively to the vortex pressure fields 26a, 26b in the flowing fluid, which would reduce the sensitivity of the sensor cantilever 50, especially to weaker vortex pressure fields at low flow rates. On the other hand, the sensor block 70 could be mounted in a manner that protrudes some or all of the shank portion 76 and proximal end 72 into the flow passage 18, but protrusion of the sensor block 70 into the flow passage 18 may cause more interference with fluid flow than necessary.

Persons skilled in the art will understand that the sensor cantilever 50 can be mounted to extend into the flow path 18 of the meter body 14 in a variety of ways, but, to maintain the integrity of the flow path 18, the mounting should be leak-proof to fluids that flow in the flow path 18. The example sensor mounting block 70 for mounting the sensor cantilever 50 in the meter body 14 in a leak-proof manner for water and other liquids is best seen in FIGS. 8-12. That example sensor mounting block 70 includes a flange portion 74, which is shaped for seating on an external surface 64 of the meter body 14, and a shank portion 76, which is sized and shaped for insertion into a hole 66 in the meter body 14. The hole 66 extends from the external surface 64 of the meter body 14 to the flow passage 18. The sensor mounting block 70 is mounted on the meter body 14 with the flange portion 74 of the sensor mounting block 70 on the external surface 64 of the meter body 14 and with the shank portion 76 of the sensor mounting block 70 extending into the hole 66, which can be slotted to accommodate the example oblong shape of the shank 76 in the example sensor mounting block 70 illustrated in FIGS. 10 and 11.

The sensor cantilever 50 of the vortex sensor unit 12 includes a transducer vane 51 comprising a piezoelectric polymer film 52 (FIGS. 13-15) that generates electric signals when stressed, e.g., when the transducer vane 51 is flexed from side to side as indicated by the arrow 44 in FIGS. 7, 8, 10, 12, and 14. The transducer vane 51 is anchored in fixed, immovable relation to the mounting block 70, and a length L of the transducer vane 51 extends in a cantilever manner from the mounting block 70 to a distal end 62 that is unrestrained as shown in FIGS. 8-12, so the largest stress in the transducer vane 51 is at the fixed end 72 of the cantilever sensor portion 60 of the transducer vane 51 when the sensor cantilever 50 and transducer vane 51 are flexed from side to side as shown by the arrow 44 in FIGS. 7, 8, 10 and 12. The length L of the transducer vane 51 is approximately the same as the length L of the sensor cantilever 50 for purposes of this description, because the thickness of the elastomer integument 86 (explained in more detail below) is very thin as compared to the length L. Therefore, length L may be used interchangeably as referring to either the length of the transducer vane 51 or the entire sensor vane 50.

Figure 12:
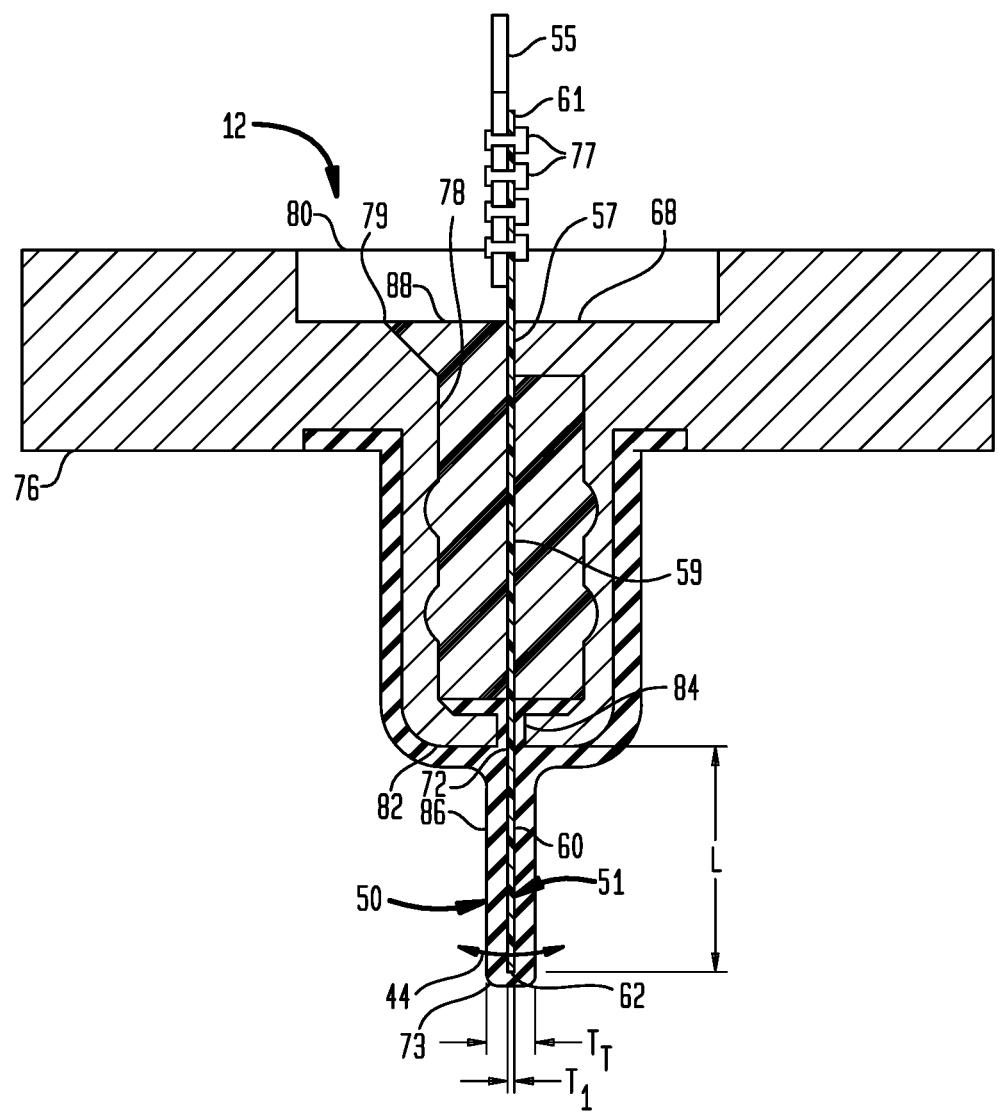
FIG. 12 is an enlarged cross-section view of the example vortex sensor unit taken along section line 12-12 in FIG. 9.

The sensor mounting block 70 has a potting cavity 78 that extends from an outer surface 80 of the flange portion 74 into the shank portion 76 toward, but not all the way to, a distal end 82 of the shank portion 76. A narrow slot 84 extends the remainder of the way through the shank portion 76 from the potting cavity 78 all the way to the distal end 82 of the shank portion 76. The narrow slot 84 is wide enough to accommodate extension of the transducer vane 51 from the potting cavity 78 through the narrow slot 84, from where it extends in a cantilever manner to its distal end 62, which is effectively at the distal end 73 of the cantilever sensor 50 except for the small thickness of the elastomer integument 86 at the distal end 73 of the cantilever sensor 50. Because the thicknesses of the transducer vane 51 and the integument 86 are so small, they are exaggerated and not drawn to any scale in the drawings. Accordingly, the transducer vane 51 is positioned in the mounting block 70 extending effectively from the distal end 73 of the sensor cantilever 50, through the narrow slot 84, and through the potting cavity 78 to a distance above the outer surface 80 of the sensor block 70, as shown in FIGS. 8 and 12, such that the proximal end 61 of the transducer vane 51 is outside the mounting block 70 and the distal end 62 of the transducer vane 51 is inside the flow passage 18. As best seen in FIGS. 9 and 12, a plurality of positioning nubs 67, 68, 69 extend inwardly from the top rim 79 of the potting cavity 78 in the mounting block 70 for centering and initially holding the upper portion 57 of the transducer vane 51 in place until a potting material 88, e.g., epoxy or other sealant, fills and cures in the potting cavity 78 around the mid-portion 59 of the transducer vane 51. The potting material 88 holds the transducer vane 51 securely in position in the mounting block 70 and prevents fluids in the flow passage 18 from leaking past the transducer vane 51. The shank portion 76 of the mounting block 70 and the cantilever sensor portion 60 of the transducer vane 51 are encapsulated with an elastomer integument 86, e.g., silicone rubber or other elastomer material with a Young's modulus of 1,000 psi or less, as will be described in more detail below.

In the example vortex sensor unit 12 illustrated in FIGS. 8-12, the transducer vane 51 can be assembled, potted, cured and then encapsulated together with the mounting block 70 with the elastomeric integument 86 before mounting the vortex sensor unit 12 into the meter body 14. For mounting the assembled vortex sensor unit 12 into the meter body 14, the mounting block 70 can be positioned onto the meter body 14 as illustrated in FIG. 8 with the shank portion 76 of the mounting block 70 inserted into the hole 66 in the meter body 14 so that the sensor cantilever 50 of the vortex sensor unit 12 extends into the flow passage 18. A seal 90, e.g., a O-ring seal, is positioned around the shank portion 76 of the mounting block 70 so that the seal 90 is compressed between the mounting block 70 and the meter body 14 when the mounting block 70 is mounted in the meter body 14. With the flange portion 74 of the mounting block 70 seated on the external surface 64 of the meter body 14, the mounting block 70 is fastened on the meter body 14, for example, with screws 92. In this manner, the vortex sensor unit 12 is mounted securely in the meter body 14 with the sensor cantilever 50 extending the length L into the flow passage 18. The contacts 53, 55 of the transducer vane 51 are attached to electrical conductors 94, 96 (see FIGS. 4-6), which extend from the electric circuit on the circuit board 28 for conduction of the electric signals generated by the piezoelectric polymer film 52 of the transducer vane 51 to the electric circuit on the circuit board 28 for processing.

The circuit board 28 can be mounted in the meter housing 14 in any convenient manner. In the example flowmeter 10 shown in FIGS. 1-8, the circuit board 28 is illustrated as mounted on a plurality of ribs 98, which are provided on an inside surface 100 of the meter housing 14. The display 34 in the example flowmeter 10 is mounted on the circuit board 28, and a transparent cover panel 102 is mounted over the display 34 to keep out dust, water, and other contaminants. The valve body 14 of the example flowmeter 10 in FIGS. 1-8 also has a battery cavity 116 for containing a battery 118, which provides electric power to the electric circuit that processes the signals generated by the piezoelectric polymer film 52 and the display 34. A battery cover 120 closes the battery cavity 116 to keep water, dust, and other contaminants away from the battery 118.

As mentioned above, the vortex sensing unit 12 has an inexpensive structure that is capable of detecting vortex pressure fields over a wide range of pressure intensities and over a wide frequency spectrum, thus large turndown ratio, which enables the flow meter 10 equipped with the vortex sensing unit 12 to provide highly accurate volumetric flow rate measurements (e.g., 99 to 100 percent accuracy) over a wide range of flow rates. For example, a typical residential domestic water system may have one-half (½) inch to one (1) inch diameter pipes for conveying water at 50 to 100 pounds per square inch (psi) pressure, so that water flowing in such a typical domestic water system can vary from zero to about twenty (20) gallons per minute (gpm) or more. In order for the flowmeter 10 sized and adapted for use in or with such typical residential domestic water systems, e.g., with a (½) inch to one (1) inch diameter flow passage 18, to provide highly accurate (e.g., 99 to 100 percent) volumetric flow rate measurements of water flowing in or from such typical residential domestic water systems, e.g., in a range from 0.5 gpm to 20 gpm or more, i.e., a turndown ratio of at least 40 to 1, the example vortex sensing unit 12 has to detect pressure fields of vortices 26a, 26b over a frequency range of about 3 to 120 hertz (Hz). Also, the intensity range of vortex pressure fields is proportional to the square of the flow rate. Therefore, for a turndown ratio of 40 to 1, the transducer vane 51 has to withstand and provide accurate vortex detection over an intensity range of about 1,600 to 1. In other words, the frequency of the vortex pressure fields in water flowing through the flow passage 18 at 20 gpm is forty (40) times higher than the frequency of the vortex pressure fields in water flowing through the flow passage at 0.5 gpm, and the vortex pressure fields in water flowing through the flow passage 18 at 20 gpm are over three orders of magnitude (e.g., 1,600 times) more intense than the intensities of the vortex pressure fields in the water flowing through the flow passage at 0.5 gpm. Accordingly, in order to provide 99 to 100 percent flow rate measurement accuracy in this example flowmeter 10 application from 0.5 gpm to 20 gpm, the example vortex sensing unit 12 has to be sensitive enough to detect the very weak, low frequency vortex pressure fields in water flowing through the flow passage 18 at 0.5 gpm, yet robust enough to not only detect, but also to withstand, the much stronger and higher frequency vortex pressure fields in water flowing through the flow passage 18 at 20 gpm, i.e., forty times higher frequency and 1,600 times higher intensity, than the fluid flowing at 0.5 gpm. The vortex sensor unit 12 in FIGS. 5-12 not only provides that kind of sensitivity, robustness, and 99 to 100 percent accuracy with a turndown ratio of 40 to 1, it has been shown to provide a turndown ratio of 50 to 1 (i.e., frequency range of about 3 to 150 Hz and intensity range of about 2,500 to 1), and it is simple and inexpensive enough that the example flow meter 10 can be mass produced and marketed in mass retail and big box store markets at prices attractive to average home owning consumers, landscape professionals, builders, and many others.

To provide the required sensitivity to the very weak vortex pressure fields in the fluid at the lowest volumetric flow rate, e.g., 0.5 gpm of water, the transducer vane 51 of the vortex sensor unit 12 comprises a piezoelectric polymer film 52 laminated together with a thin, compliant, substrate 54 as best seen in FIGS. 13 and 14. The piezoelectric polymer film 52 can be, for example, a thin film of polyvinylidene fluoride (PVDF), which is a well-known piezoelectric material that is very compliant, sensitive, and mechanically strong, and it is available commercially in thicknesses of 5 to 150 micrometers. Such thin PVDF piezoelectric polymer films have small cross-sectional areas, so relatively small longitudinal forces in the piezoelectric polymer film resulting from bending moments caused by side-to-side flexures 44 create large stresses in the piezoelectric polymer film 52. Also, the piezoelectric polymer film 52 is laminated together with a compliant substrate 54, for example, a thin, compliant, polyester film (e.g., Mylar™), polyimide film (e.g., Kapton™), cellulose film, or other suitable compliant film material, as shown in FIGS. 13 and 14, to form the transducer vane 51. Such lamination increases the stresses in the piezoelectric polymer film 52 caused by bending moments in the transducer vane 51 when the transducer vane 51 is flexed from side to side (as indicated by the arrow 44) by the vortex pressure fields in the flowing fluid. Such increased stresses result in stronger piezoelectric signals from the piezoelectric polymer film 51. The term "compliant" in this context means that the piezoelectric polymer film 52 provides very little bending (as distinct from shear) resistance to lateral forces applied in the direction of the thinnest cross-sectional dimension of the transducer vane 51, as illustrated by the lateral force arrows $F_1$ and $F_2$ in FIG. 14, so that even very weak vortex pressure fields in the flowing fluid cause enough side-to-side flexure 44 of the piezoelectric polymer film 52 to produce detectable electric signals. An epoxy or other suitable adhesive can be used to laminate the piezoelectric polymer film 52 together with the compliant substrate 54.

As best seen in FIGS. 13 and 14, first and second electrodes 63, 65, e.g., silver ink or other conductive material, on opposite lateral surfaces of the piezoelectric polymer film 52 collect opposite polarity charges from the opposite lateral surfaces that are produced by the piezoelectric polymer film 52 when the piezoelectric polymer film 52 is flexed from side to side as shown by the arrow 44. The first electrically conductive contact 53 is connected electrically to the first electrode 63, and the second electrically conductive contact 55 is connected electrically to the second electrode 65 for conducting electric signals generated by the piezoelectric polymer film 52 to the electric circuit on the circuit board 28. These electrical connections can be made by the respective electrically conductive pins 75, 77 or any other convenient electrical connection instrumentalities. The electrodes 63, 65 can be very thin in relation to the piezoelectric polymer film 52 and the substrate film 54 so that they do not significantly affect the laminate of the piezoelectric film 52 with the substrate film 54 to form the transducer vane 51 and do not add significant thickness to the thickness $T_1$ of the transducer vane 51. Because the thicknesses of the transducer vane 51 components are so small, they are exaggerated and not drawn to any scale in the drawings.

PVDF piezoelectric polymer films are available commercially in thicknesses from, e.g., 5 to 150 micrometers, and polyester films, e.g., Mylar™, are available in thicknesses from, e.g., 12 to 350 micrometers. Therefore, the example laminated transducer vane 51 comprising the piezoelectric polymer film 52 bonded to the film substrate 54 can be very thin, e.g., about 20 to 500 micrometers, which is about as thin as, or thinner than, tissue paper. The thinner the transducer vane 51 is with these materials, the more compliant it is, thus potentially the more sensitive it is to vortex pressure fields. Generally, the more the transducer vane 51 deflects with each passing vortex 26a, 26b, the stronger the electric signal that will be produced by the piezoelectric polymer film 52 of the transducer vane 51. Therefore, the higher the compliance of the entire sensor cantilever 50 is, the stronger the electric signals produced by the transducer vane 51 will be. Sensor devices comprising piezoelectric polymer films laminated together with Mylar™ polyester films the same as, or similar to, the transducer vane 51 illustrated in FIGS. 13 and 14 are available commercially from a variety of sources. For example, but not for limitation, the DT series piezo film sensor elements manufactured by Measurement Specialties, Inc., of Hampton, Va., United States, are available in thicknesses from about 20 to 70 micrometers, which are suitable for use as the transducer vane 51 in the example sensor block 70 and in the example flow meter 10. An appropriate specific thickness $T_1$ for the transducer vane 51 for a particular application depends on the fluid, the flow velocities, thus vortex pressure field frequencies, the vortex pressure field intensities at which vortex pressure fields have to be measured, and other criteria as explained herein.

Alternatively, the piezoelectric polymer film 52 can be laminated between a compliant substrate 54 and a compliant superstrate 56 as shown in FIG. 15 to form an alternative transducer vane 51'. Such lamination causes any compressive forces in the transducer vane 51 to be converted into larger longitudinal extensive forces, which create larger stresses in the piezoelectric polymer film 52, thus stronger electrical signal response to flexures 44.

For the 0.5 gpm to 20 gpm volumetric flow rate range for water in the example flow passage 18 of the example flowmeter 10 describe above, a transducer vane 51 thickness $T_1$ of about 100 to 400 micrometers, e.g., about 200 micrometers, provides the compliance and sensitivity needed to detect the weak vortex pressure field intensities in volumetric flow rates of water as low as the 0.5 gpm end of the example desired 0.5 gpm to 20 gpm volumetric flow rate range residential domestic water system applications discussed above.

While the transducer vane 51 described above is very compliant and sensitive to even weak vortex pressure fields associated with the low flow rates at the low end of the 40 to 1 or 50 to 1 turndown ratio capability of the vortex sensor unit 12 and example flow meter 10 described above, it cannot withstand alone the high frequencies and high intensities of the vortex pressure fields of the high flow rates at the high end of the 40 to 1 or 50 to 1 turndown ratio described above. Tests have shown that, while the piezoelectric polymer films 52 (e.g., PVDF) and polyester (e.g., Mylar™) film 54 that comprise the transducer vane 51 are highly elastic below their yield points, the severely high frequencies and intensities encountered in the high flow rates of the 40 to 1 or 50 to 1 turndown ratios cause those materials to warp and deform plastically in relatively short times. Tests have also shown that such warping and plastic deformations not only deteriorate accuracy, but actually exaggerate flexure, twisting, and other deleterious effects in the transducer vane 51 to the point of exceeding yield points of the materials and resulting in cracking, breaking, or other disintegration of the transducer vane 51. Therefore, to provide additional stability and to maintain the geometric shape and structural integrity of the transducer vane 51 to withstand the higher flow rates, the transducer vane 51 is encapsulated in a silicone rubber integument 86, but, fortunately, the silicone rubber integument 86 does not significantly decrease the compliance and sensitivity of transducer vane 51 for detecting the much weaker vortex pressure fields at the low flow rates as will be explained in more detail below. Silicone rubber is an elastomer material with a very low Young's modulus (e.g., 100 to 1,000 psi) and is almost a perfect spring material. Therefore, the silicone rubber integument 86, unlike the piezoelectric polymer film 52 (e.g., PVDF) and polyester (e.g., Mylar™) film 54, always returns to its original geometric shape after deformation with no plastic creep or cold flow. Therefore, test have shown that the silicone rubber integument 86 maintains the geometric shape and integrity of the transducer vane 51 over very long lifetimes, even at the high flow rates of the 40 to 1 or 50 to 1 turndown ratio, while still providing sufficient sensitivity at the very low flow rates of those ranges for 99 to 100 percent accuracy and repeatability in those turndown ratios.

The transducer vane 51 is mounted in the mounting block 70 in a cantilever manner and encapsulated in the elastomeric integument 86 to provide the sensor cantilever 50 with a sensor length L as described above. When the sensor cantilever 50 is flexed from side to side by the vortex pressure fields in the flowing fluid as shown by the arrow 44 in FIGS. 7, 8, and 12, the maximum bending moment, thus maximum stress, occurs at the proximal end 72 of the sensor cantilever 50, and lesser bending moments, thus stresses, occur all along the sensor length L of the sensor cantilever 50, except at the very distal end point 62 of the transducer vane 51 where the stress is zero. For a given vortex pressure field, the longer the sensor cantilever length L is, the larger the bending moments (thus stresses) will be in the transducer vane 51, including the piezoelectric polymer film 52, at and near the proximal end 72. Also, for a given sensor length L, the stronger the vortex pressure fields are that act on the sensor cantilever 50, the larger the bending moments (thus stresses) will be in the transducer vane 51, including the piezoelectric polymer film 52, at and near the proximal end 72. Accordingly, the stress, thus signal strength from the piezoelectric polymer film 52, for a given vortex pressure field strength can be increased by increasing the sensor length L. Conversely, the stress, thus signal strength, can be decreased by decreasing the sensor length L.

With appropriate thickness and sensor length L dimensions, the vortex sensor unit 12 is able to detect very weak vortex pressure fields, for example, vortex pressure fields in water flowing as low as 0.5 gpm in a ½ to 1-inch diameter flow channel 18 and encapsulation of the transducer vane 51 with the integument 86 provides structural support and robustness that enables the transducer vane 51 with the thickness $T_1$ and sensor length L parameters needed for high compliance, thus sensitivity, to weak vortex pressure fields at the low flow rates to also withstand the high intensity and high frequency vortex pressure fields at the higher flow rates as explained above. Also, the integument 86 fits around the transducer vane 51 in intimate contact with the surfaces of the transducer vane 51, but the integument 86 is not adhered or bonded to the transducer vane 51 (e.g., it fits around the transducer vane 51 like a glove). Accordingly, the integument 86 is slidable in relation to the surfaces of the transducer vane 51, thus adds very little resistance to flexure 44 of the sensor cantilever 50. Therefore, the integument 86 does not diminish significantly either the compliance or the sensitivity of the piezoelectric transducer 51 in the sensor cantilever 50. In general, an integument 86 that is an elastomer with a Young's modulus of 1,000 psi or less encapsulating the transducer vane 51 laminate that has an effective Young's modulus in a range of 200,000 psi to 1,000,000 psi provides adequate structural support and other advantages discussed above and below, without significantly attenuating the compliance and sensitivity of the transducer vane 51, thereby enabling the wide flow rate measurement range, which would not be possible for the transducer vane 51 without the elastomer integument 86.

In addition to providing the geometric and structural integrity needed for the transducer vane 51 to withstand the high flow rates while maintaining sufficient sensitivity for the low flow rates, the silicone rubber integument 86 has a number of other significant attributes in this application. For example, silicone rubber is the most ideal elastic (spring) material known, so it is effective to protect the piezoelectric transducer 51 from impacts of particles in the flowing fluid, cavitations, and other shock waves. Silicone rubber integument 86 is also leak proof and forms a hermetic seal around the transducer vane 51 for protection from air, chemicals, and contaminants, and it seals the mounting block 70 to the flowmeter body 14 to prevent leakage of fluid out of the flow passage 18 past the mounting block 70. The silicone rubber integument 86 is electrically non-conductive and impermeable to water, so it electrically insulates the electrodes 63, 65 and the contacts 53, 55 from fluid and particles that flow through the flow passage 18. The large difference between the Young's modulus of the silicone rubber integument 86 and the flowmeter body 14 provides a gross mismatch of impedances between the flowmeter body 14 and the silicone rubber integument 86, thus damps out external vibrations and other noise inputs, which makes the signals generated by the piezoelectric polymer 52 in transducer vane 51 easier to detect. The large difference between the very small Young's modulus of the silicone rubber integument 86 and the much larger Young's modulus of the materials that comprise the transducer vane 51 (e.g., piezoelectric polymer film 52 and polyester or other substrate film 54) also provides a gross mismatch of impedances between the integument 86 and the transducer vane 51, which dampens vibrations and resonances in the transducer vane 51 enough to stabilize the transducer vane 51 at the higher frequencies and intensities described above in the higher flowrates that would otherwise destroy the transducer vane 51.

Also, since the integument 86 is not adhered or bonded to the transducer vane 56, thus allowing slidable movement between the transducer vane 51 and the integument 86 as the sensor cantilever 50 flexes side to side 44 in response to the vortex pressure fields in the flowing fluid, the depth (thickness) of the integument 86 is not part of the second moment of area (area moment of intertia) of the transducer vane 51, which also minimizes diminution of compliance of the sensor cantilever 50 and attenuation of the sensitivity of the transducer vane 51 by the integument 86. For the example water metering application of the flowmeter 10 at the example flow rates described above, integument 86 thickness in a range of about 200 micrometers to 1,000 micrometers provides adequate protection, geometric preservation, structural integrity, and stabilization as described above for the transducer vane 51. Therefore, with the thickness of the integument 86 on each side of the transducer vane 51 added to the thickness $T_1$ of the transducer vane 51 explained above, the total thickness $T_T$ of the cantilever vane 50 for the example water meter application described above is in a range of 250 to 1,100 micrometers. An increase in compliance of the sensor cantilever 50 does not necessarily correspond to a reduction in the fatigue life of the transducer vane 51. Therefore, it is not necessary to sacrifice compliance for fatigue life. As long as maximum stress is less than the yield points of the piezoelectric polymer film 52 and the substrate film 54 or the effective yield point of the laminate of those films that comprise the transducer vane 54, the transducer vane 51 will remain intact. As mentioned above, the integument 86 absorbs impact of particles or other objects in the flowing fluid that may hit the sensor cantilever 50, which helps to keep the stress in the transducer vane 51 components below the yield points. Accordingly, the sensor cantilever 50 is preferably, although not necessarily, optimized in size and placement in the flow passage 18 to produce a strong, maximum signal in response to the vortices 26a, 26b throughout a desired flow rate range without exceeding the stress limits of the transducer vane 51 components and without interfering more than necessary with the fluid flow 30, 31 through the flow passage 18.

The sensitivity of the sensor cantilever 50, i.e., the output signal strength from the piezoelectric polymer film 52, varies as a function of the penetration of the sensor cantilever 50 into the fluid, which is the sensor length L of the sensor cantilever 50 when the vortex sensor unit 12 is mounted in the flowmeter 10 as described above and the flow passage 18 is flowing full of the fluid. Design considerations for a desired flow rate range may include the following:

F=Frequency of vortex pressure fields in fluid flowing through the flow passage 18.
V=Velocity of the fluid flowing through the flow passage 18.
Q=Volumetric flow rate of the fluid flowing through the flow passage.
L=Length, thus penetration, of the sensor cantilever 50 into the fluid flowing in the flow passage 18.
$T_1$=Thickness of the transducer vane 51.
$T_2$=Combined thickness of the elastomeric integument 86 on both sides of the transducer vane 51.
$T_T$=Total thickness of the sensor cantilever 50.
Sv=Sensitivity of the transducer vane 51.
$S_c$=Sensitivity of the sensor cantilever 50.
C=Compliance of the sensor cantilever 50.
$A_s$=Signal attenuation factor.
$E_1$=Young's modulus for the transducer vane 51.
$E_2$=Young's modulus for the elastomeric integument 86.
The frequency F is directly proportional to the velocity V of the fluid flowing through the flow passage 18, i.e., $$F \propto V \qquad (1)$$

For a given size flow passage 18, volumetric flow rate Q is directly proportional to the velocity V, i.e., $$Q \propto V \qquad (2)$$

Therefore, flow rate Q is directly proportional to the frequency of the vortex pressure fields, i.e., $$Q \propto F \qquad (3)$$

Compliance C is inversely proportional to Young's modulus E, i.e., $$C \propto 1/E \qquad (4)$$

For the transducer vane 51, sensitivity $S_v$ (i.e., relative signal strength generated by the piezoelectric polymer film 52 of the transducer vane 51) is a function of the volumetric flow rate Q, the length L, thickness $T_1$ of the transducer vane 51, and Young's modulus of the transducer vane 51, as follows:

$$S_v \propto \frac{(Q^2)\left(\frac{L^4}{T_1^3}\right)}{E_1} \qquad (5)$$

For the sensor cantilever 50, the sensitivity $S_v$ of the transducer vane 51 is slightly attenuated by an attenuation factor $A_s$ due to the elastomeric integument 86 around the transducer vane 51, so the sensitivity $S_c$ of the sensor cantilever 50 is a function of the same parameters as the sensitivity $S_v$ of the transducer vane 51 multiplied by the attenuation factor $A_s$ as follows:

$$S_c \propto \frac{(Q^2)\left(\frac{L^4}{T_1^3}\right)}{E_1} A_s \qquad (6)$$

where $A_s$ is an attenuation factor that accounts for the sensitivity attenuation effect of the elastomeric integument 86 on the sensitivity of the transducer vane 51, as follows:

$$A_s = \frac{1}{1 + \left(\frac{E_2}{E_1}\right)\left[2\left(\frac{T_2}{T_1}\right)^3\right]} \quad (7)$$

As shown by Equation (7), the attenuation factor $A_s$ is a fraction with a value of one (1) in numerator and a denominator comprising a value of one (1) plus a value that involves the ratio of the Young's modulus $E_2$ of the elastomeric integument 86 to the Young's modulus $E_1$ of the transducer vane 51 and the ratio of the combined thickness $T_2$ of the elastomeric integument 86 on both sides of the transducer vane 51 to the thickness $T_1$ of the transducer vane 51. Without getting into all of the specifics of any particular example, it is apparent from Equation (7) that, given the very large difference (approximately three orders of magnitude) between the extremely small Young's modulus $E_2$ of the integument 86 (e.g. silicone rubber at 145 to 725 psi) as compared to the very large Young's modulus $E_1$ of the piezoelectric polymer film 52 and polyester film substrate 54 (e.g., Mylar™) that comprise the transducer vane 51 (e.g., 290,000 to 710,000 psi) that the very large Young's modulus $E_2$ of the transducer vane 51 components dominate overwhelmingly the other values in the denominator of Equation (7) with the result that the attenuation factor $A_s$ attenuates the sensitivity $S_v$ of the transducer vane 51 by only a few percent to result in the sensitivity $S_c$ of the sensor cantilever 50. Therefore, in determining optimal length L and total thickness $T_T$ for the sensor cantilever 50 for a particular application, the attenuating effect of the elastomer integument 86 can be ignored at least for initial calculations and then considered, if desired, in final refinements.

On the other hand, the sensor length L and, to a lesser extent, the total thickness $T_T$ of the sensor cantilever 50 have very significant effects on the sensitivity $S_c$ of the sensor cantilever 50. As illustrated by Equation (6), the sensor cantilever 50 has a sensitivity $S_c$ that is proportional to the fourth power of the length L of the sensor cantilever 50 (see FIGS. 5, 14, and 16) and inversely proportional to the cube of the thickness $T_1$ of the sensor cantilever 50. To determine a size and placement of the sensor cantilever 50 in the flow passage 18 to produce a strong signal in response to the vortices 26a, 26b without exceeding the stress limits of the transducer vane 51 components and without interfering more than necessary with the fluid flow 30, 31 through the flow passage 18 one can first determine the maximum vortex pressure field $P_{max}$ for the desired flow rate range of the fluid to be measured with the flow meter 10. The maximum vortex pressure field $P_{max}$ for a desired maximum volumetric flow rate $Q_{max}$ can be determined using measurement techniques known to persons skilled in the art. Some allowance in that determination can be made for safety margin if desired. Then an optimum length L and thickness $T_v$ for the transducer vane 51 can be determined by an iterative process of calculations to determine a maximum stress $\sigma_{max}$ for selected trial values of the sensor cantilever 50 length and the transducer thickness $T_1$, with a goal of approaching, but not exceeding, the maximum stress $\sigma_{max}$ to exceed the yield point of either the piezoelectric polymer film 52 or the substrate film 54 and, at the same time, allowing the sensor cantilever 50 protrude a sufficient distance into the flow channel 18 (i.e., length L) for the sensitivity needed to produce a detectable and usable signal in the weaker vortex pressure fields at the lowest desired measurable flow rate but not so far as to interfere unnecessarily with the flow of fluid in the flow passage 18. In general, the more the transducer vane 51 flexes (deflects), the greater the stress in the transducer vane 51. Accordingly, the maximum stress $\sigma_{max}$ that approaches, but does not exceed, the yield point corresponds with the maximum allowable deflection. Therefore, a length L of a transducer vane 51 with a given Young's modulus of the transducer vane 51 (a composite of the films 52 and 54 Young's moduli) and with a given thickness $T_1$, which results in the maximum allowable deflection of the vane 51, thus the maximum stress $\sigma_{max}$, when exposed to the maximum vortex field pressure $P_{max}$, is the maximum allowable length L for that transducer vane 51 with that given thickness $T_1$ and that Young's modulus. As a corollary, for a a transducer vane 51 with a given Young's modulus and a given length L exposed to the maximum vortex field pressure $P_{max}$, the thickness $T_1$ that allows enough deflection of the transducer vane 51 to reach the maximum stress $\sigma_{max}$ is the minimum allowable thickness $T_1$. The maximum stress $\sigma_{max}$ for a particular length L and a particular thickness $T_1$ under an applied maximum vortex field pressure $P_{max}$ can be determined by:

$$\sigma_{max} = \left(\frac{L}{T_1}\right) P_{max} \quad (8)$$

At the same time, it is desirable to minimize the sensor length L to the extent feasible for at least several reasons, including: (i) To reduce flow disturbance by the sensor cantilever 50, which contributes to pressure loss and can adversely affect flowmeter measurement accuracy; (ii) To minimize the chance of damaging the sensor cantilever 50 due to entrained solid particles in the flowing fluid impacting the sensor cantilever 50; and (iii) The fluid flow adjacent to the interior wall 16 of the flow passage 18 is typically less turbulent than the fluid flow in the center portion of the flow passage 18, thus less subject to flow noise that is detrimental to meter accuracy. Accordingly, an optimization of a length L long enough and thickness $T_1$ thin enough to provide the sensitivity needed to produce detectable and usable signals for the fluid and volumetric flow rates desired, but which length L does not protrude more than necessary into the flow channel 18. Such optimization of the example sensing cantilever 50, using a piezoelectric vane 51 comprising compliant polyvinylidene fluoride (PVDF) for the piezoelectric polymer film 52, polyester film (e.g., Mylar™) for the substrate sheet 54, and silicone rubber for the elastomer integument 86 has been shown to provide a dynamic range of 2,000 to 1, i.e., capable of withstanding and measuring accurately high-pressure vortex pressure fields that are two thousand times stronger than the weakest vortex pressure field that is accurately detectable with the sensor. Such a 2,000 to 1 dynamic range yields a flowmeter range of greater than 40 to 1, which enables accurate volumetric flow rate measurements of water in a ½ to 1-inch flow passage over a range for which the highest flow rate measurement can be over 40 times larger than the lowest flow rate measurement. For example, such a flowmeter can provide accurate flow rate measurements of water in a ½ to 1-inch flow passage 18 in a range from 0.5 gpm to 20 gpm.

An optimum $L/T_1$ ratio for measuring flow rate of water in an example embodiment flowmeter 10 with a flow passage 18 of ½ to 1-inch diameter and equipped with an example vortex sensing unit 12 was in a range of 20 to 200, e.g., the length L of the transducer vane 51 being 20 to 200 times greater than the thickness $T_1$, and a $L/T_T$ ratio in a range of 4 to 10, (i.e., the length L in a range of 4 to 10 times larger than the total thickness $T_T$ of the sensor cantilever 50), which provided a 1,600 to 1 dynamic range and flowmeter range greater than 40 to 1 for water metering as explained above. Within that $L/T_1$ range, the thickness $T_1$ of the transducer vane 51 can be in a range of 0.005 to 0.030 inch, although the scaling of the design parameters of the piezoelectric vane 51 may vary widely depending on flowmeter design performance requirements for various particular applications and fluids.

The example flowmeter 10 is illustrated with an inlet conduit 104, which encloses an inlet portion of the flow passage 18, and an outlet conduit 106, which encloses an outlet portion of the flow passage 18. The inlet conduit 104 and the outlet conduit 106 can be used for providing any convenient connection fittings. The example flowmeter 10 in FIGS. 1-3, 5, and 7 illustrate a conventional garden hose female fitting 108 mounted on the inlet conduit 104 and a conventional garden hose male fitting 110 mounted on the outlet conduit 106 for connecting the flowmeter 10 between two conventional garden hoses 112, 114.

The foregoing description provides examples that illustrate the principles of the invention, which is defined by the features that follow. Since numerous insignificant modifications and changes will readily occur to those skilled in the art once they understand the invention, it is not desired to limit the invention to the exact example constructions and processes shown and described above. Accordingly, resort may be made to all suitable combinations, subcombinations, modifications, and equivalents that fall within the scope of the invention as defined by the features. The words "comprise," "comprises," "comprising," "include," "including," and "includes" when used in this specification, including the features, are intended to specify the presence of stated features, integers, components, or steps, but they do not preclude the presence or addition of one or more other features, integers, components, steps, or groups thereof. Also, directional terms such as "over", "above", "below", "upper", "front", "lateral", and others that refer to orientations or relative positions in views in the drawings are not intended to limit the flowmeter 10 or vortex sensor unit 12 to use in any particular orientation.

The embodiments of the invention in which an exclusive property or privilege is claimed are defined as follows:

1. Vortex sensor apparatus, comprising:
   a cantilever mounted transducer vane comprising a piezoelectric material; and
   an elastomeric integument encapsulating the transducer vane, wherein the elastomeric integument has a Young's modulus in a range of 100 psi to 1,000 psi.

2. The vortex sensor apparatus of claim 1, wherein the elastomeric integument is silicone rubber.

3. The vortex sensor apparatus of claim 1, wherein the transducer vane has a Young's modulus of 200,000 psi to 1,000,000 psi.

4. The vortex sensor apparatus of claim 1, wherein the transducer vane has a Young's modulus that is at least three orders of magnitude higher than the Young's modulus of the elastomeric integument.

5. The vortex sensor apparatus of claim 1, wherein the piezoelectric material comprises a piezoelectric polymer.

6. The vortex sensor apparatus of claim 1, wherein the piezoelectric material comprises polyvinylidene fluoride (PVDF) film.

7. The vortex sensor apparatus of claim 6, wherein the transducer vane includes a lamination that comprises the PVDF film laminated together with an elastic substrate, the lamination having a composite Young's modulus in the range of 200,000 psi to 1,000,000 psi.

8. The vortex sensor apparatus of claim 6, wherein the transducer vane includes a lamination that comprises the PVDF film laminated together with an elastic substrate, the lamination having a composite Young's modulus in the range of 400,000 psi to 800,000 psi.

9. The vortex sensor apparatus of claim 2, wherein the silicone rubber integument fits around the transducer vane in intimate contact with the surfaces of the transducer vane, but the silicone rubber integument is not bonded or adhered to the transducer vane.

10. Flowmeter apparatus for measuring a flow of fluid, comprising:
    a meter body that includes an interior wall which forms a flow passage from an inlet end to an outlet end for conducting the flow of fluid through the meter body;
    a vortex generator positioned in the flow passage for generating vortex pressure fields in the flow of fluid through the meter body; and
    vortex detector apparatus, including a transducer vane comprising a piezoelectric material mounted in a cantilever manner in a mounting block that extends through the interior wall to position the transducer vane in the flow passage between the vortex generator and the outlet end for exposing the transducer vane to the vortex pressure fields so that the vortex pressure fields cause the transducer vane to oscillate and thereby produce electric signals that are indicative of the vortex pressure fields, said transducer vane being encapsulated in an elastomeric integument comprising silicone rubber or some other elastomeric material with a low modulus of elasticity in a range of 100 psi to 1,000 psi. to form a pressure seal between the transducer vane and the mounting block and to isolate the transducer vane from mechanical vibrations in the meter body and thereby attenuate such mechanical vibrations in the meter body from interfering with the electric signals produced by the transducer vane.

11. The flowmeter apparatus of claim 10, wherein the integument is not bonded to the transducer vane.

12. The flowmeter apparatus of claim 10, wherein the integument is not bonded to either the piezoelectric polymer film or the elastic substrate.

13. The flowmeter apparatus of claim 10, wherein the transducer vane and the elastomer integument form a sensor cantilever that has a total thickness $T_T$ and a sensor length L extending from the interior wall into the flow passage, wherein a ratio of the sensor length L to the total thickness $T_T$ is in a range of 4 to 10.

14. A method of increasing an ability of a transducer vane comprising a piezoelectric polyvinylidene fluoride (PVDF) film to withstand large pressure and frequency ranges, comprising encapsulating the transducer vane with an elastomeric integument that has a Young's modulus in a range of 100 psi to 1,000 psi.

15. The method of claim 14, wherein the transducer vane has a Young's modulus that is at least three orders of magnitude greater than the Young's modulus of the elastomeric integument.

16. The method of claim 15, wherein the transducer vane has a Young's modulus in a range 200,000 psi to 1,000,000 psi.

17. The method of claim 14, wherein the elastomeric integument is not bonded or adhered to the transducer vane.

* * * * *